(12) United States Patent
Benson

(10) Patent No.: US 12,093,078 B2
(45) Date of Patent: Sep. 17, 2024

(54) DOCKING STATIONS

(71) Applicant: Hewlett-Packard Development Company, L.P., Spring, TX (US)

(72) Inventor: Roger D. Benson, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/347,024

(22) Filed: Jul. 5, 2023

(65) Prior Publication Data
US 2023/0359244 A1 Nov. 9, 2023

Related U.S. Application Data

(62) Division of application No. 17/043,801, filed as application No. PCT/US2018/052357 on Sep. 24, 2018, now Pat. No. 11,726,525.

(51) Int. Cl.
| | |
|---|---|
| *G06F 1/16* | (2006.01) |
| *G06F 1/3296* | (2019.01) |
| *H04L 67/00* | (2022.01) |
| *H04M 1/72409* | (2021.01) |
| *H04M 1/72415* | (2021.01) |

(52) U.S. Cl.
CPC .......... *G06F 1/1632* (2013.01); *G06F 1/3296* (2013.01); *H04L 67/34* (2013.01); *H04M 1/72409* (2021.01); *H04M 1/72415* (2021.01); *H04N 2201/0058* (2013.01)

(58) Field of Classification Search
CPC ..... G06F 1/1632; G06F 1/3296; H04L 67/34; H04M 1/72409; H04M 1/72415; H04M 1/04; H04N 2201/0058
See application file for complete search history.

(56) References Cited

U.S. PATENT DOCUMENTS 6,023,587 A * 2/2000 Watts, Jr. .............. G06F 1/1632
710/72
6,549,968 B1 4/2003 Hart
8,868,796 B1 10/2014 Wojcik et al.
(Continued)

FOREIGN PATENT DOCUMENTS

EP 0809173 A2 11/1997
WO 2010/069048 A1 6/2010

OTHER PUBLICATIONS

Lich, Bet al., Manage Surface Dock Firmware Updates, May 9, 2017, pp. 32, https://docs.microsoft.com/en-us/surface/manage-surface-dock-firmware-updates.
(Continued)

*Primary Examiner* — Azizul Choudhury
(74) *Attorney, Agent, or Firm* — Quarles & Brady LLP

(57) ABSTRACT

A docking station including a network interface controller to communicatively couple the docking station to a network, a controller to manage the docking station, and a hub communicatively coupled to both the network interface controller and the controller. In one example, the hub is communicatively coupled to a computing device. In another example, the controller causes the hub to use the computing device as a master based on the computing device being communicatively coupled to the hub and causes the hub to use the controller as the master based on the computing device not being communicatively coupled to the hub.

13 Claims, 6 Drawing Sheets

(56) References Cited

U.S. PATENT DOCUMENTS

| | | |
|---|---|---|
| 9,128,796 B2 | 9/2015 | Chitre et al. |
| 2002/0119800 A1 | 8/2002 | Jaggers et al. |
| 2007/0006214 A1 | 1/2007 | Dubal et al. |
| 2010/0095139 A1* | 4/2010 | Murphy ............. G06F 1/266 713/300 |
| 2010/0138582 A1 | 6/2010 | Bird et al. |
| 2013/0046280 A1 | 2/2013 | Martin et al. |
| 2014/0342669 A1 | 11/2014 | Zeung et al. |
| 2015/0363339 A1 | 12/2015 | Huang et al. |
| 2016/0154431 A1 | 6/2016 | Vroom et al. |
| 2016/0306616 A1 | 10/2016 | Tomppo |
| 2018/0293197 A1 | 10/2018 | Grobelny et al. |
| 2019/0250928 A1* | 8/2019 | Vidyadhara ............. G06F 8/65 |

OTHER PUBLICATIONS

Lobdell, M., Robust Over-the-air Firmware Updates Using Program Flash Memory Swap on Kinetis Microcontrollers, Jun. 2012, 20 pgs, http://cache.freescale.com/files/microcontrollers/doc/app_note/AN4533.pdf.

* cited by examiner

FIG. 3 300

```
Transition a Hub from Using a Computing Device as a Master
to Using a Docking Station Controller as the Master
302
            |
Receive an Update for the Docking Station
304
            |
Install the Update on the Docking Station
306
```

DOCKING STATIONS

CROSS REFERENCE TO RELATED APPLICATIONS

The present application is a divisional of U.S. patent application Ser. No. 17/043,801, filed Sep. 30, 2020, and entitled "DOCKING STATIONS", the entire contents of which is hereby incorporated by reference.

BACKGROUND

Computing devices may improve the productivity of users. For example, the computing devices may perform numerous operations rapidly. The computing devices may include user input and output devices to allow the user to control the operations and interact with data on which the operations are performed. For example, the input devices may include a mouse, a keyboard, a touch screen, a camera, a microphone, or the like. The output devices may include a display, a speaker, a printer, haptic components, or the like. In some examples, the computing device may be a portable computing device, such as a laptop, a phone, a tablet, a phablet, a smartwatch, or the like.

BRIEF DESCRIPTION OF THE DRAWINGS

FIG. 3 is a flow diagram of an example method to manage a docking station.

DETAILED DESCRIPTION OF THE DRAWINGS

Figure 1:
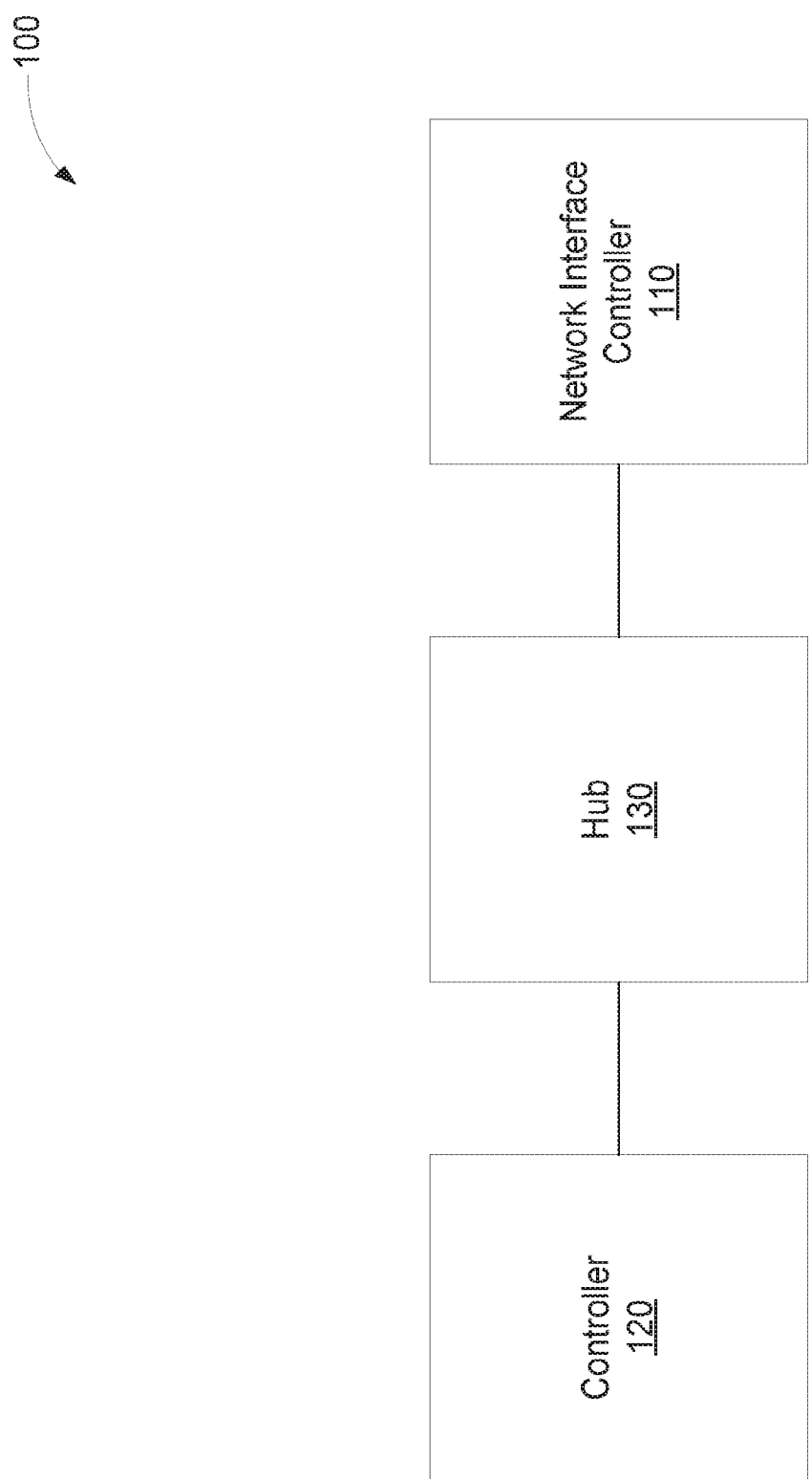
FIG. 1 is a block diagram of an example system to manage a docking station.

The capabilities of a computing device, such as a portable computing device, may be improved by connecting the computing device to a docking station. For example, the docking station may be connected to a display that is larger or higher quality than the computing device's display or that can be used in combination with the computing device's display. The docking station may also, or instead, connect computing device to a mouse or a keyboard that is more ergonomic or offers more capabilities than the computing device's mouse or the computing device's keyboard. Similarly, the docking station may be connected to other user input or output devices (e.g., a camera, a microphone, a speaker, a touchscreen display, a printer, a haptic component, etc.) that provide additional capabilities or improved usability to the user. The docking station may also provide power or a wired network connection to the computing device without having to separately connect the computing device to a power source or wired network connection. A wired network connection may provide a higher bandwidth, lower latency, or the like to the computing device relative to a wireless network connection.

The docking station may include various controllers for managing the capabilities of the docking station. The controllers may execute software to manage the capabilities. The software on the docking station may be updated to remove security vulnerabilities or improve capabilities as such vulnerabilities are detected or such improvements are developed. In an example, an update to the software for a controller may be downloaded to the computing device, and the computing device may install the update on the docking station to update the software.

Some organizations may implement a hoteling environment for users of computing devices. In a hoteling environment, users may not be assigned a seat nor a docking station. The user may find an open seat and use the docking station at that seat. As a result, some docking stations may be used more frequently than others. Indeed, some docking stations may be used rarely and spend long periods of time between uses. If such docking stations rely on computing devices to provide updates, the docking stations may similarly spend long periods of time between updates. When a computing device is connected to such a docking station, it may have a large backload of updates to install. Installing the large backload of updates may be time consuming. A user may not want to stay connected to the docking station long enough to install the updates or may decline to install the updates, which further exacerbates the problem of the docking station not being updated timely. Moreover, the user may be at risk while waiting for the updates to install or if the user declines to install the updates. Accordingly, updating the docking station without relying on a computing device would improve the user experience and reduce the security risk over situations where a computing device is relied upon.

FIG. 1 is a block diagram of an example system 100 to manage a docking station. In an example, the system 100 may be the docking station. The system 100 may include a network interface controller 110. As used herein, the term "controller" refers to hardware (e.g., a processor, such as an integrated circuit or other circuitry) or a combination of software (e.g., programming such as machine- or processor-executable instructions, commands, or code such as firmware, a device driver, programming, object code, etc.) and hardware. Hardware includes a hardware element with no software elements such as an application specific integrated circuit (ASIC), a Field Programmable Gate Array (FPGA), etc. A combination of hardware and software includes software hosted at hardware (e.g., a software module that is stored at a processor-readable memory such as random access memory (RAM), a hard-disk or solid-state drive, resistive memory, or optical media such as a digital versatile disc (DVD), and/or executed or interpreted by a processor), or hardware and software hosted at hardware. The network interface controller 110 may communicatively couple the docking station to a network.

The system 100 may also include a controller 120. The controller 120 may also be referred to as a docking station controller. The controller 120 may manage the docking station. For example, the controller 120 may manage various controllers on the docking station. The controller 120 may configure the various controllers, transmit commands to the various controllers, or the like.

The system 100 may include a hub 130. The hub 130 may be communicatively coupled to the network interface controller 110 and the controller 120. The hub 130 may also communicatively couple to a computing device (not shown). For example, when a computing device is connected to the docking station, the connection may communicatively couple the computing device to the hub 130. In an example, the hub 130 may be a universal serial bus (USB) hub.

The controller 120 may cause the hub 130 to use the computing device as a master based on the computing device being communicatively coupled to the hub 130 and may cause the hub 130 to use the controller 120 as the master based on the computing device not being communicatively coupled to the hub. For example, the controller 120 may detect whether or not the computing device is communicatively coupled to the docking station, and the controller 120 may configure the hub 130 accordingly.

Figure 2:
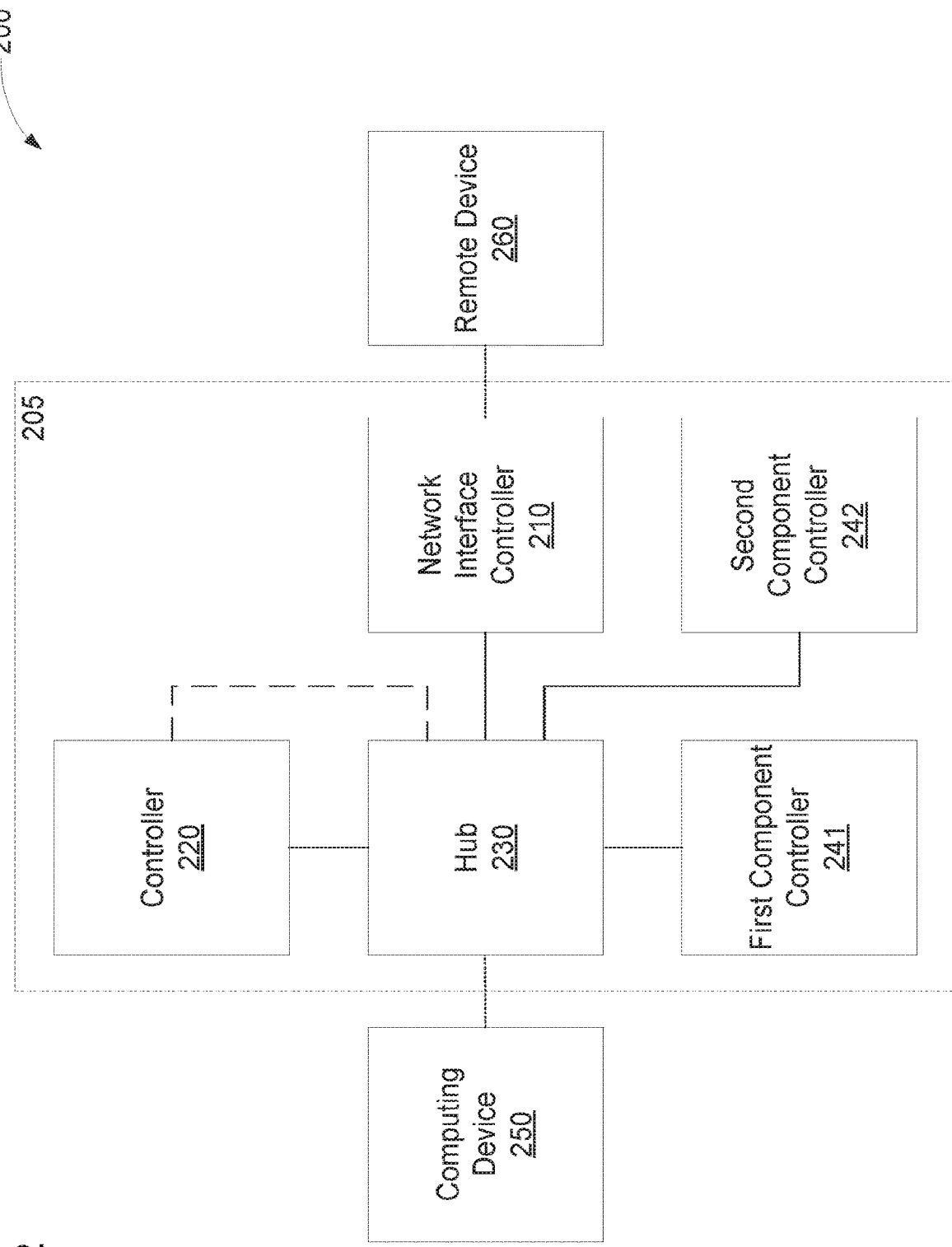
FIG. 2 is a block diagram of an environment including another example system to manage a docking station.

FIG. 2 is a block diagram of an environment 200 including another example system 205 to manage a docking station. In an example, the system 205 may be the docking station. The system 205 may include a network interface controller 210. The network interface controller 210 may communicatively couple the docking station to a network. The network may be a local area network (LAN), a wide area network (WAN), such as the internet, or the like. A remote device 260 may be communicatively coupled to the network, and the network interface controller 210 may communicatively couple to the remote device 260 via the network.

The system 205 may include a controller 220, a hub 230, and first and second component controllers 241, 242. The controller 220 may also be referred to as a docking station controller. The controller 220 may manage the docking station. In an example, the docking station and the controller 220 may not be a full computer. For example, the docking station may lack user input or output devices other than ports and connectors, and the controller 220 may not be configured to interface with user input or output devices. Similarly, the docking station and the controller 220 may include software specifically for managing the computing device but may not include user applications or other software for providing a full compute experience to the user. In other examples, the docking station may be a full computer. The first and second component controllers 241, 242 may manage a specific functionality or feature of the docking station. The first and second component controllers 241, 242 may include a USB power delivery controller, a video signal converter, an additional hub, a communication protocol controller (e.g., a thunderbolt controller), a codec, or the like.

The hub 230 may be communicatively coupled to the network interface controller 210, the controller 220, and the first and second component controllers 241, 242. The hub may also communicatively couple to a computing device 250.

For example, a user may connect and disconnect the computing device 250 from the docking station. When the computing device 250 is connected to the docking station, it may be communicatively coupled to the hub 230. When the computing device 250 is disconnected from the docking station, it may not be communicatively coupled to the hub 230.

The controller 220 may control whether the hub 230 uses the computing device 250 or the controller 220 as a master. For example, the master may be a USB master. The master may control communications with slave devices via the hub. The controller 220 may cause the hub 230 to use the computing device 250 as a master based on the computing device 250 being communicatively coupled to the hub 230 and may cause the hub 230 to use the controller 220 as the master based on the computing device 250 not being communicatively coupled to the hub 230. Accordingly, the hub 230 may cause the network interface controller 210 and the first and second component controllers 241, 242 to be slaves of the computing device 250 based on the computing device 250 being communicatively coupled to the hub 230 and may cause the network interface controller 210 and the first and second component controller 241, 242 to be slaves of the controller 220 based on the computing device 250 not being communicatively coupled to the hub 230.

In an example, the controller 220 may detect whether the computing device 250 is communicatively coupled to the hub 230 or may detect whether the computing device 250 is connected to the docking station. For example, the hub 230 may indicate to the controller 220 whether the computing device 250 is connected; the controller 220 may detect whether the computing device 250 is connected to a pin (e.g., a sense pin); or the like. Based on detecting a change in whether the computing device 250 is connected, the controller 220 may cause the hub 230 to change whether the computing device 250 or the controller 220 is the master.

The controller 220 may instruct the hub 230 to enter a reset state. For example, the controller 220 may use a first bus to instruct the hub 230 to enter a reset state, may assert a reset signal, or the like. The first bus may be distinct from a second bus, such as USB, used by the controller 220 and the hub 230 to communicate with the computing device 250 and the components of the docking station. The first bus may be a system management bus (SMBus), an inter-integrated circuit (I2C) bus, or the like. While the hub 230 is in the reset state, the controller 220 may instruct the hub 230 to use the computing device 250 or the controller 220 as the master according to whether the computing device 250 has been connected or disconnected. Once the hub 230 has been reconfigured, the controller 220 may instruct the hub 230 to exit the reset state (e.g., using the first bus, a reset signal, etc.). In an example, controller 220 and the computing device 250 may be communicatively coupled to the hub 230 by multiplexers, and the controller 220 may switch the master of the hub 230 by controlling the multiplexers without placing the hub 230 in a reset state or instructing the hub 230 to change the master.

In an example, after the controller 220 causes the hub 230 to transition to using the controller 220 as a master, the controller 220 may cause the docking station to enter a low power state. For example, the controller 220 may cause the docking station to enter the low power state after it detects a predetermined time of inactivity, may cause the docking station to enter the low power state almost immediately after transitioning the hub 230, or the like. As used herein, the term "almost immediately" refers to a delay of no more than a few minutes, a few seconds, a fraction of a second, or the like. For example, the controller 220 may cause the docking station to enter the low power state as soon as it has finished instructing the hub 230 to exit the reset state, after waiting for the hub 230 to exit the reset state, or the like.

The docking station may receive updates regardless of whether the computing device 250 is connected or not. In an example where the computing device 250 is disconnected, the controller 220 may manage the update process. The controller 220 may pull updates from the remote device 260, or the remote device 260 may push updates to the controller 220. In a push model, the remote device 260 may transmit a wake command, such as a wake-on-LAN packet, to the network interface controller 210. The network interface controller 210 may indicate to the controller 220 that the wake command was received, and the controller 220 may cause the docking station to transition from the low power state to an on state (e.g., a full power state). The controller 220 may transition itself to an on state without transitioning other components to an on state or may transition all components to an on state.

After receiving the wake command, the controller 220 may indicate docking station capabilities to the remote device 260. The remote device 260 may transmit a request for docking station capabilities, or the controller 220 may transmit the docking station capabilities without first receiving a request. The docking station capabilities may include an indication of whether or not the computing device 250 is connected, an indication of whether the controller 220 can update the docking station without the computing device 250, indications of the components included in the docking station, information usable to determine a version of docking station software (e.g., a version of firmware for the controller 220, the hub 230, the network interface controller 210, the first or second component controllers 241, 242, etc.), or the like. The remote device 260 may determine based on the docking station capabilities whether to send an update to the docking station, for example, based on whether the version of the docking station software is a most recent version.

Based on a determination to send an update, the remote device 260 may transmit the update to the controller 220 via the network interface controller 210, and the controller 220 may cause the network interface controller 210 to receive the update from the remote device. In an example, the remote device 260 may indicate the update is available, and the controller 220 may download the update from the remote device 260 in response to receiving the indication. The controller 220 may install the update on the docking station. For example, the controller 220 may determine which component (e.g., the network interface controller 210, the controller 220, the hub 230, the first or second component controllers 241, 242, etc.) is to receive the update. The controller 220 may modify or replace the software stored for that component based on the update. In a pull model, the controller 220 may operate similarly, but it may determine when to check for updates without receiving a wake command or a request for docking station capabilities. For example, the controller 220 may transmit docking station capabilities to the remote device 260 periodically, aperiodically, or the like to determine whether an update is available.

In an example where the computing device 250 is connected, the computing device 250 may mange the update process. The computing device 250 may pull updates from the remote device 260, the remote device 260 may push updates to the computing device 250. In a push model, the remote device 260 may transmit a request for docking station capabilities to the computing device 250. The computing device 250 may communicate with the controller 220 to determine the docking station capabilities and transmit the docking station capabilities to the remote device 260. In a pull model, the computing device 250 may transmit the docking station capabilities to the remote device 260 without receiving a request.

The remote device 260 may determine based on the capabilities whether to send an update. Based on a determination to send an update, the remote device 260 may transmit the update to the computing device 250, and the computing device 250 may receive the update from the remote device 260 via the network interface controller 210. The computing device 250 may install the update on the docking station. For example, the docking station may instruct the controller 220 to install the update or may determine the component being updated and communicate directly with the component being updated (e.g., the network interface controller 210, the controller 220, the hub 230, the first or second component controllers 241, 242, etc.) to modify or replace the software for that component.

Accordingly, the docking station may be updated in a timely manner because it can be updated regardless of whether a computing device is connected. Moreover, the docking station may be updated without inconveniencing a user by receiving an update when the user has not connected a computing device to the docking station. In an example, the remote device 260 may check the docking stations for out-of-date software or send updates at a time when the docking stations are not being used, such as at night, to further reduce any inconvenience to users.

FIG. 3 is a flow diagram of an example method 300 to manage a docking station. A processor may perform the method 300. At block 302, the method 300 may include transitioning a hub of a docking station from using a computing device as a master to using a docking station controller as the master. For example, the hub may communicatively couple devices or components using a protocol that implements a master-slave communication model. The computing device may initially be the master for the hub and the devices or components coupled to the hub. Transitioning may include reconfiguring the hub so that the docking station controller is the master for the hub and the devices or components coupled to the hub.

Block 304 may include receiving an update for the docking station. The update for the docking station may be received at the docking station. For example, the docking station may be communicatively coupled to a network, and a device on the network may transmit the update to the docking station. At block 306, the method 300 may include installing the update on the docking station. The docking station controller may install the update on the docking station. For example, the docking station controller may modify or replace software on the docking station based on the update. Referring to FIG. 1, in an example, the controller 120 may transition the hub 130 at block 302; the controller 120 or the network interface controller 110 may receive the update at block 304; and the controller 120 may install the update on the docking station.

Figure 4:
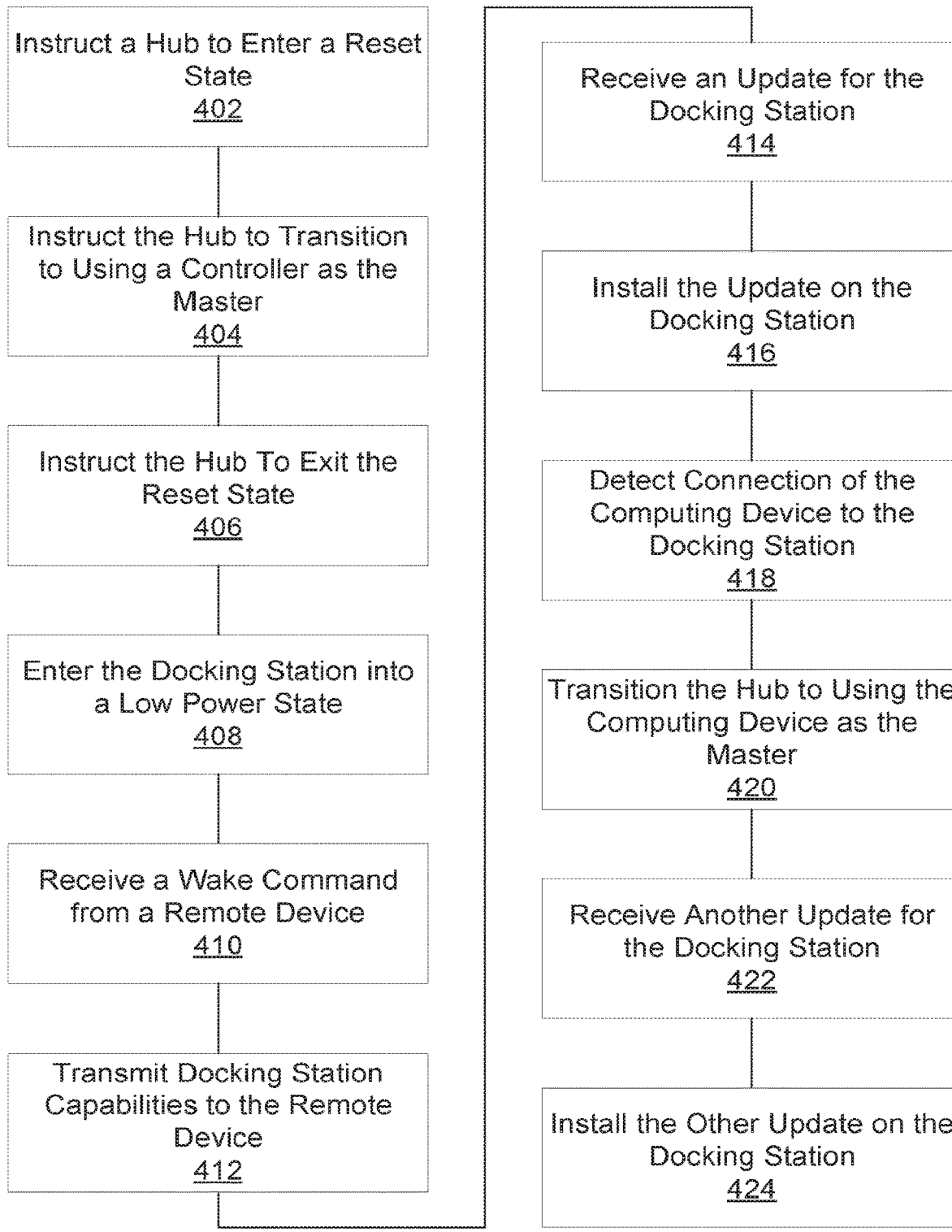
FIG. 4 is a flow diagram of another example method to manage a docking station.

FIG. 4 is a flow diagram of another example method to manage a docking station. A processor may perform the method 400. The method 400 may initially include transitioning a hub of a docking station from using a computing device as a master to using a docking station controller as the master, for example, in response to detecting disconnection of the computing device from the docking station. Transitioning the hub may include performing block 402, 404, and 406. At block 402, the method 400 may include instructing the hub to enter a reset state. For example, an instruction to enter the reset state may be transmitted to the hub over a first bus, a reset signal may be asserted, or the like.

Block 404 may include instructing the hub to transition to using the docking station controller as the master. The hub may discontinue using the computing device as a master and instead use the docking station controller as the master. The hub may change from using a port able to connect to the computing device as an upstream port to using a port coupled to the docking station controller as the upstream port. At block 406, the method 400 may include instructing the hub to exit the reset state. For example, an instruction to exit the reset state may be transmitted to the hub over the first bus, a reset signal may be deasserted, or the like.

Block 408 may include entering the docking station into a low power state. For example, once the computing device is disconnected, the docking station may not need to perform many operations. Accordingly, various controllers in the docking station may be transitioned to state in which they use little or no power. At block 410, the method 400 may include receiving a wake command from a remote device. For example, the docking station may be connected to the remote device via a network. The remote device may transmit the wake command, and the wake command may be received from the remote device via the network. Receiving the wake command may also include transitioning the docking station from the low power state to an on state. The on state may be a higher power state than the low power state or may be a full power state.

Block 412 may include transmitting docking station capabilities to the remote device. The docking station capabilities may include information usable to determine a version of docking station software, such as version numbers for the docking station software. In an example, the remote device may transmit a request for the docking station capabilities, and the docking station capabilities may be transmitted in response to the request. Alternatively, or in addition, the docking station capabilities may be transmitted without first receiving a request from the remote device. The remote device may decide whether to send an update to the docking station based on the docking station capabilities.

At block 414, the method 400 may include receiving the update to the docking station. The update to the docking station may be received at the docking station. In an example, based on the remote device deciding to send the update to the docking station, the docking station may transmit the update to the docking station via the network, and the docking station may receive the update via the network.

Block 416 may include installing the update on the docking station. The docking station controller may install the update on the docking station. For example, installing the update may include determining which component of the docking station is to receive the update. Installing the update may further include modifying or replacing software on the docking station. Modifying or replacing software may include modifying or replacing computer-executable instructions stored on a computer-readable medium.

At block 418, the method 400 may include detecting connection of the computing device to the docking station. For example, detecting the connection of the computing device may include detecting a communicative coupling between the computing device and the hub, detecting the connection of the computing device using a pin (e.g., a sense pin), or the like. Block 420 may include transitioning the hub from using the docking station controller as the master to using the computing device as the master. For example, block 420 may include elements similar to blocks 402 through 406 to transition the hub to using the computing device as the master.

Block 422 may include receiving another update for the docking station. The computing device may receive the update for the docking station. For example, the remote device may have requested docking station capabilities from the computing device, and the computing device may have transmitted the docking station capabilities to the remote device. In an example, the computing device may have transmitted the docking station capabilities without receiving the request to do so. The remote device may have decided based on the docking station capabilities to send the other update. The remote device may transmit the other update for the docking station via the network, and the computing device may receive the other update from the docking station via the network.

At block 424, the method 400 may include installing the other update on the docking station. The computing device may install the other update on the docking station. For example, the computing device may provide the update to the controller and instruct the controller to install the update, or the computing device may communicate with a component of the docking station to modify or replace the software for that component. In an example, the hub may be the hub 230 of FIG. 2, the controller 220 may perform block 402, 404, 406, 408, 410, 412, 414, 416, 418, 420, or 424; the network interface controller 210 may perform block 410, 412, 414, or 422; and the computing device 210 may perform block 422 or 424.

Figure 5:
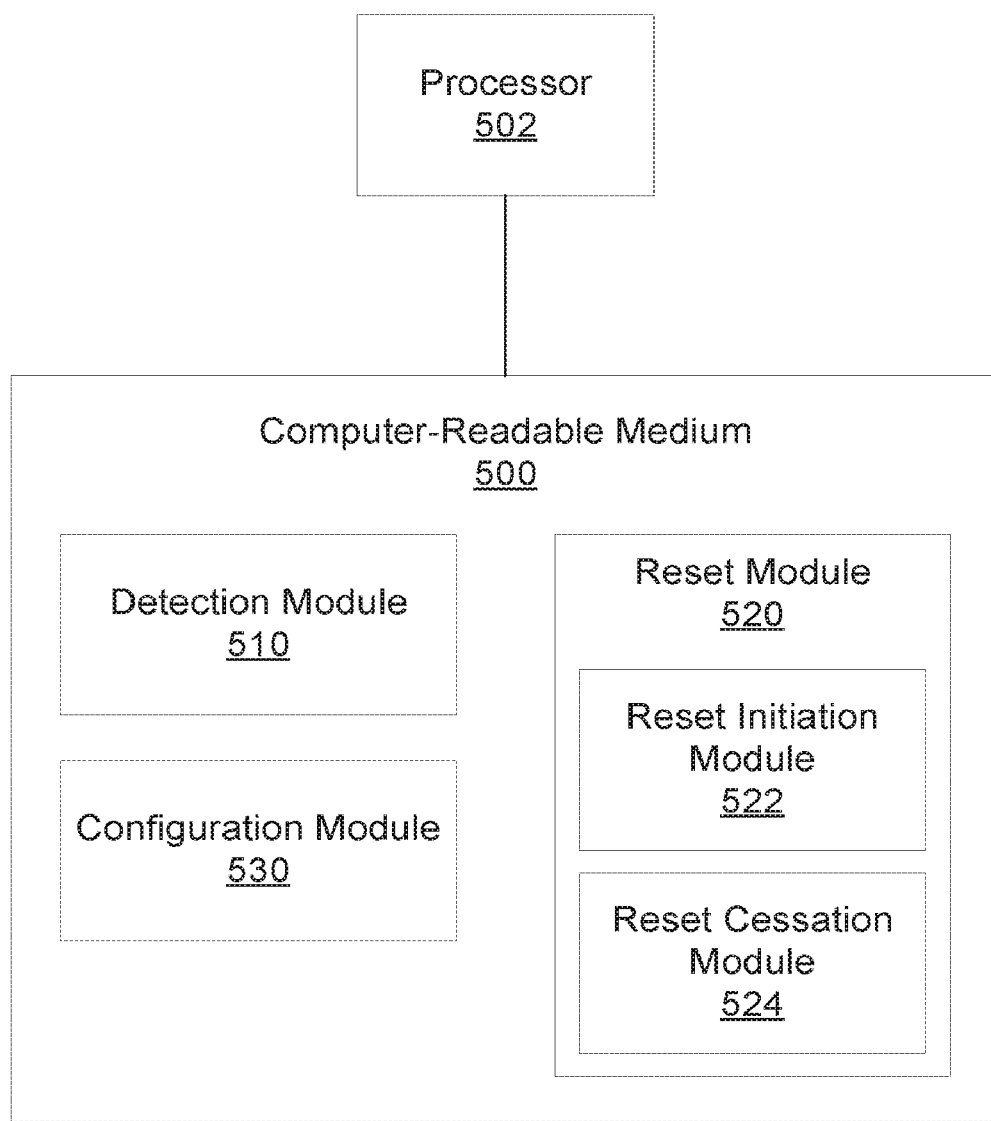
FIG. 5 is a block diagram of an example computer-readable medium including instructions that cause a processor to manage a docking station.

FIG. 5 is a block diagram of an example computer-readable medium 500 including instructions that, when executed by a processor 502, cause the processor 502 to manage a docking station. The computer-readable medium 500 may be a non-transitory computer-readable medium, such as a volatile computer-readable medium (e.g., volatile RAM, a processor cache, a processor register, etc.), a non-volatile computer-readable medium (e.g., a magnetic storage device, an optical storage device, a paper storage device, flash memory, read-only memory, non-volatile RAM, etc.), and/or the like. The processor 502 may be a general purpose processor or special purpose logic, such as a microprocessor, a digital signal processor, a microcontroller, an ASIC, an FPGA, a programmable array logic (PAL), a programmable logic array (PLA), a programmable logic device (PLD), etc.

The computer-readable medium 500 may include a detection module 510. As used herein, a "module" (in some examples referred to as a "software module") is a set of instructions that when executed or interpreted by a processor or stored at a processor-readable medium realizes a component or performs a method. The detection module 510 may include instructions that, when executed, cause the processor 502 to detect disconnection of the computing device from a docking station. For example, the detection module 510 may cause the processor 502 to detect the disconnection by receiving an indication the computing device has been disconnected (e.g., from a hub of the docking station), by detecting a change in a signal from a sensing element, or the like.

The computer-readable medium 500 may include a reset module 520. The reset module 520 may include a reset initiation module 522. The reset initiation module 522 may cause the processor 502 to instruct the hub of the docking station to enter a reset state. For example, the reset initiation module 522 may cause the processor 502 to transmit a command to the hub instructing the hub to enter the reset state, to assert a reset signal to the hub, or the like.

The computer-readable medium 500 may include a configuration module 530. The configuration module 530 may cause the processor 502 to instruct the hub to configure itself to use the processor 502 as a master. The hub may have been previously configured to use the computing device as the master prior to the disconnection of the computing device. The configuration module 530 may cause the processor 502 to cause the hub to stop using the computing device as the master and to instead use the processor 502 as the master. The configuration module 520 may cause the processor 502 to instruct the hub to configure itself to use the processor 502 as the master while the hub is in the reset state.

The reset module 520 may also include a reset cessation module 524. The reset cessation module 524 may cause the processor 502 to instruct the hub to exit the reset state. For example, the reset cessation module 524 may cause the processor 502 to transmit a command to the hub instructing the hub to exit the reset state, to deassert a reset signal to the hub, or the like. The reset cessation module 524 may cause the processor 502 to instruct the hub to exit the reset state after or in response to the configuration module 530 causing the processor 502 to instruct the hub to configure itself to use the processor 502 as the master. In an example, when executed by the processor 502, the detection module 510, the reset module 520, the reset initiation module 522, the reset cessation module 524, or the configuration module 530 may realize the controller 120 of FIG. 1.

Figure 6:
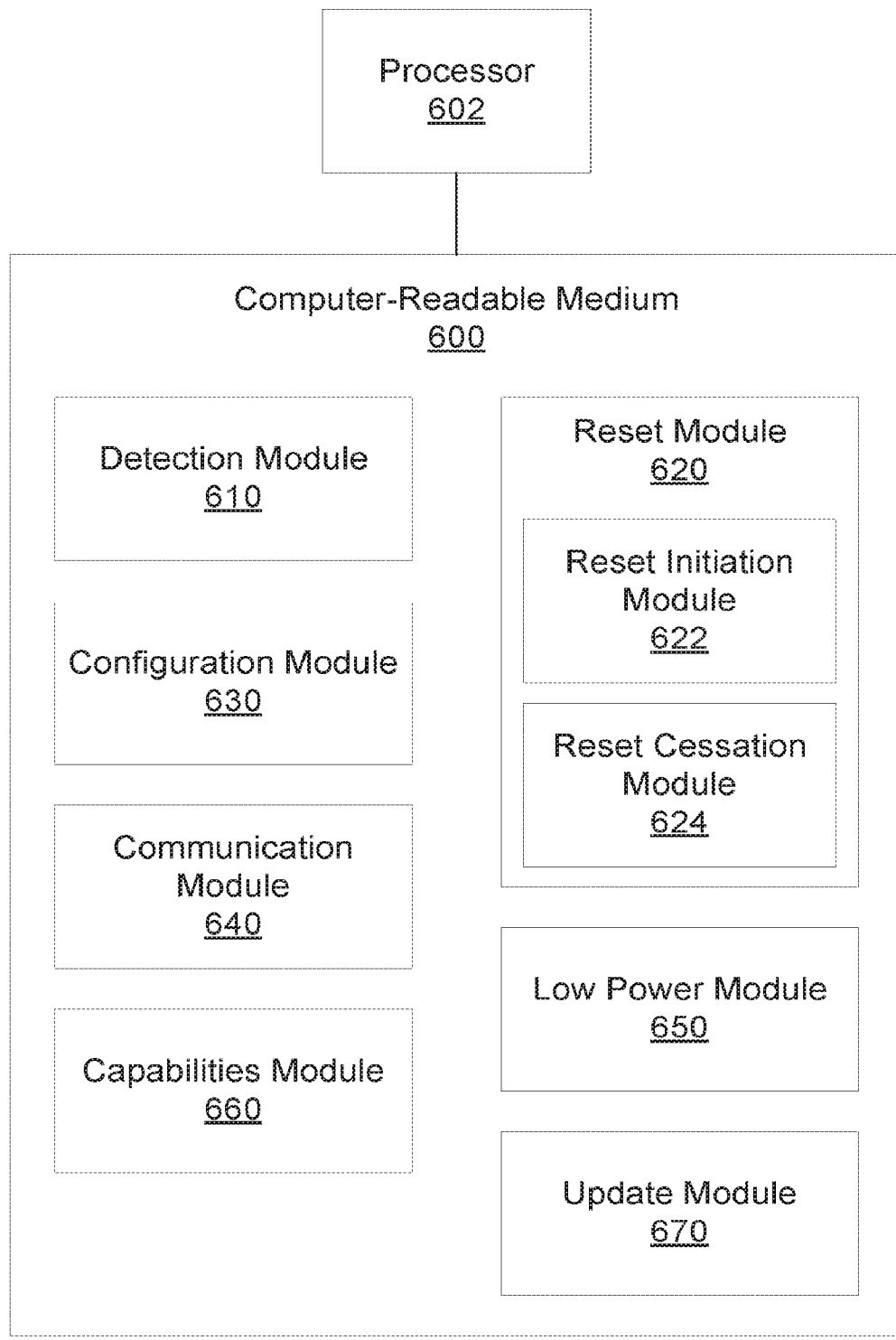
FIG. 6 is a block diagram of another example computer-readable medium including instructions that cause a processor to manage a docking station.

FIG. 6 is a block diagram of another example computer-readable medium 600 including instructions that, when executed by a processor 602, cause the processor to manage a docking station. The computer-readable medium 600 may include a detection module 610. The detection module 610 may include instructions that, when executed, cause the processor 602 to detect disconnection of a computing device from a docking station. In an example, the docking station may include a hub able to communicatively couple to the computing device when the computing device is connected to the docking station. The hub may detect disconnection of the computing device from the docking station, and the detection module 610 may cause the processor 602 to receive an indication from the hub that the docking station has been disconnected. In some examples, the docking station may include a pin (e.g., a sense pin) to sense when the computing device is connected. The processor 602 may be electrically coupled to the pin, and the detection module 610 may cause the processor 602 to detect a change in a signal from the pin.

The computer-readable medium 600 may include a reset module 620. The reset module 620 may include a reset initiation module 622. The reset initiation module 622 may cause the processor 602 to instruct the hub of the docking station to enter a reset state. In an example, the processor 602 may be electrically coupled to a reset pin of the hub, and the reset initiation module 622 may cause the processor 602 to assert a reset signal to the reset pin. In another example, the processor 602 may be electrically coupled to the hub by a first bus. The reset initiation module 622 may cause the processor 602 to use the first bus to transmit an instruction that instructs the hub to enter the reset state.

The computer-readable medium 600 may include a configuration module 630. The configuration module 630 may cause the processor 602 to instruct the hub to configure itself to use the processor 602 as a master. For example, the hub may have been configured to use the computing device as the master prior to the disconnection of the computing device. The configuration module 630 may cause the processor 602 to use the first bus to transmit an instruction to the hub to configure itself to use the processor 602 as the master. The configuration module 630 may cause the processor 602 to transmit the instruction to the hub while the hub is in the reset state. The configuration module 630 may cause the processor 602 to instruct the hub to configure itself by causing the processor 602 to instruct the hub to change an upstream port from a port able to electrically couple to the computing device to a port electrically coupled to the processor 602.

The reset module 620 may include a reset cessation module 624. The reset cessation module 624 may cause the processor 602 to instruct the hub to exit the reset state. In the example where the processor 602 is electrically coupled to a reset pin of the hub, the reset initiation module 622 may cause the processor 602 to deassert the reset signal to the reset pin. In the example where the processor 602 is electrically coupled to the hub by the first bus, the reset cessation module 624 may cause the processor 602 to use the first bus to transmit an instruction that instructs the hub to exit the reset state.

The computer-readable medium 600 may include a communication module 640. The communication module 640 may cause the processor 602 to communicate with the hub using a second bus. For example, the communication module 640 may cause the processor 602 to communicate with the hub as the master using the second bus when the hub is configured to use the processor 602 as the master. The communication module 640 may cause the processor 602 to communicate with the hub as a slave using the second bus when the hub is configured to use the computing device as the master. The hub may communicatively couple the computing device and other components of the docking station to the processor 602 via the second bus, and the communication module 640 may cause the processor 602 to communicate with the computing device or the other components of the docking station via the second bus.

The computer-readable medium 600 may include a low power module 650. The low power module 650 may cause the processor 602 to enter itself into a low power state. The low power module 650 may cause the processor 602 to enter itself into the low power state after (e.g., immediately after) or in response to the reset cessation module 624 causing the processor 602 to instruct the hub to exit the reset state. The low power module 650 may cause the processor 602 to cause or instruct other components of the docking station to enter low power states.

The computer-readable medium 600 may include a capabilities module 660. The capabilities module 660 may cause the processor 602 to receive a request for docking station capabilities from a remote device. For example, the docking station may include a network interface controller, and the processor 602 may be communicatively coupled to the network interface controller, e.g., by the hub. The network interface controller may receive the request for the docking station capabilities from the remote device via a network, and the capabilities module 660 may cause the processor 602 to receive the request for the docking station capabilities from the network interface controller.

The capabilities module 660 may cause the processor 602 to report the docking station capabilities to the remote device. For example, the capabilities module 660 may cause the processor 602 to transmit an indication of the docking station capabilities to the network interface controller to transmit to the remote device via the network. The remote device may decide based on the docking station capabilities that the docking station should receive an update. The capabilities module 660 may cause the processor 602 to receive the update from the remote device. For example, the network interface controller may receive the update from the remote device via the network, and the capabilities module 660 may cause the processor 602 to receive the update from the network interface controller.

The computer-readable medium 600 may include an update module 670. The update module 670 may cause the processor 602 to install the update on a docking station component. For example, the update module 670 may cause the processor 602 to determine which docking station component is to receive the update. The update module 670 may cause the processor 602 to modify or replace or to instruct another controller to modify or replace computer-executable instructions stored on the computer-readable medium 600 or on another computer-readable medium on the docking station. Referring to FIG. 2, in an example, the detection module 610, the reset module 620, the reset initiation module 622, the reset cessation module 624, the configuration module 630, the communication module 640, the low power module 650, the capabilities module 660, or the update module 670, when executed by the processor 602, may realize the controller 220.

The above description is illustrative of various principles and implementations of the present disclosure. Numerous variations and modifications to the examples described herein are envisioned. Accordingly, the scope of the present application should be determined only by the following claims.

I claim:

1. A docking station, comprising:
a network interface controller to communicatively couple the docking station to a network;
a controller to manage the docking station; and
a hub communicatively coupled to the network interface controller and the controller, the hub to communicatively couple to a computing device,
the controller to cause the hub to use the computing device as a master based on the computing device being communicatively coupled to the hub and to cause the hub to use the controller as the master based on the computing device not being communicatively coupled to the hub;
the controller to command the hub to enter and remain in a reset state during the transition between using the controller as the master and the computing device as the master; and
wherein transitioning the docking station to a full power state transfers only the controller into the full power state without transferring other components of the docking station into the full power state.

2. The docking station of claim 1, wherein the hub is to cause the network interface controller to be a slave of the computing device based on the computing device being communicatively coupled to the hub and to cause the network interface controller to be a slave of the controller based on the computing device not being communicatively coupled to the hub.

3. The docking station of claim 1, wherein the controller is to receive an update from a remote device via the network interface controller based on the computing device not being communicatively coupled to the hub.

4. The docking station of claim 3, wherein the network interface controller is to receive a wake command from the remote device and the controller is to transition the docking station from a low power state to an on state and indicate capabilities to the remote device.

5. The docking station of claim 4, wherein the controller is to download the update from the remote device in response to the remote device indicating that the update is available.

6. The docking station of claim 4, wherein the wake command is a wake-on-LAN packet from the remote device.

7. The docking station of claim 1, wherein the computing device and the docking station are both within an enterprise network environment.

8. The docking station of claim 1, wherein the hub is configured to enter the reset state prior to receiving instructions to transition from using the computing device as a master to using the controller as the master.

9. The docking station of claim 8, wherein the hub is configured to exit the reset state after the transition from using the computing device as the master to using the controller as the master.

10. The docking station of claim 1, wherein hub is a universal serial bus (USB) type hub.

11. The docking station of claim 1, wherein the hub includes a sense pin within the hub.

12. The docking station of claim 11, wherein the controller determines whether or not the computing device is physically connected to the hub via the sense pin.

13. The docking station of claim 1, further comprising:
a component controller to control a peripheral device connected to the docking station.

* * * * *